United States Patent
Hellmig

(10) Patent No.: US 6,254,948 B1
(45) Date of Patent: Jul. 3, 2001

(54) SLIT PROTECTION FOR A TUBULAR BODY

(75) Inventor: Winfried Hellmig, Buxtehude (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/254,232

(22) PCT Filed: Sep. 3, 1997

(86) PCT No.: PCT/DE97/01927

§ 371 Date: Mar. 2, 1999

§ 102(e) Date: Mar. 2, 1999

(87) PCT Pub. No.: WO98/11361

PCT Pub. Date: Mar. 19, 1998

(30) Foreign Application Priority Data

Sep. 9, 1996 (DE) .............................. 196 36 377

(51) Int. Cl.[7] ..................................................... F16F 9/04
(52) U.S. Cl. .................. 428/36.9; 428/36.2; 428/36.91; 428/36.8; 138/129; 138/132; 138/137
(58) Field of Search ................... 428/36.9, 902, 428/59, 442, 181, 36.2, 36.8, 36.91; 156/175, 169; 267/64.24; 92/98, 169.4; 138/129, 132, 137

(56) References Cited

U.S. PATENT DOCUMENTS

| 3,603,350 | 9/1971 | Monroe ............................... 138/126 |
| 3,897,941 | 8/1975 | Hirtreiter et al. .................. 267/65 B |
| 4,954,194 | * 9/1990 | Crabtree ............................... 156/175 |
| 5,118,550 | * 6/1992 | Baravian et al. ...................... 428/90 |
| 5,552,206 | * 9/1996 | Knoke et al. ......................... 428/102 |

FOREIGN PATENT DOCUMENTS

| 36 43 073A | 6/1988 | (DE) . |
| 39 37 819 | 5/1991 | (DE) . |
| 44 23 602A1 | 1/1996 | (DE) . |
| 195 45 079A | 6/1996 | (DE) . |
| 0 476 451A | 3/1992 | (EP) . |
| 2 328 892 | 5/1977 | (FR) . |
| 2 015 691 | 9/1979 | (GB) . |

OTHER PUBLICATIONS

Patent Abstracts of Japan, vol. 005, No. 043 (M–060) Mar. 23, 1981 & JP 55 166514A (Hitachi Cable) Dec. 25, 1980.
Patent Abstracts of Japan, vol. 007, No. 211 (M–243) Sep. 17, 1983 & JP 58 106238A (Yokohama Gomu KK) Jun. 24, 1983.
Patent Abstracts of Japan, vol. 010, No. 167 (M–488) Jun. 13, 1986 & JP 61 017733A (Yokohama Gomu KK) Jan. 25, 1986.
Patent Abstracts of Japan vol. 010, No. 021 (M–449) Jan. 28, 1986 & JP 60 179538A (Bridgestone KK) Sep. 13, 1985.
Patent Abstracts of Japan vol. 012, No. 281 (M–842) Jun. 27, 1989 & JP 01 074333A (Sumitomo elec) Mar. 20, 1989.

* cited by examiner

*Primary Examiner*—Rena L. Dye
*Assistant Examiner*—Sow-Fun Hon
(74) *Attorney, Agent, or Firm*—Collard & Roe, P.C.

(57) ABSTRACT

A tubular body made of elastomeric material and/or plastics, in particular the bellows of a pneumatic cushioning system, consists of a outer layer, an inner layer, and an embedded reinforcement layer, shaped in particular as axial reinforcing threads. The tubular body is provided with an embedded slit protection and is in particular characterized by the following layers, from the outermost inwards: outer layer, adhesive layer, reinforcement, adhesive layer, slit protection, adhesive layer, and innermost layer.

9 Claims, 2 Drawing Sheets

SLIT PROTECTION FOR A TUBULAR BODY

DESCRIPTION

1. Field of the Invention.

The invention relates to a tubular body made of elastomeric material and/or plastic, in particular for the bellows of a pneumatic cushioning system, comprising an outer layer, an inner layer, as well as an embedded reinforcement shaped in particular in the form of axially extending, reinforcing threads (DE-A-36 43 073).

2. The Prior Art

U.S. Pat. No. 3,897,941 describes a hose-like body for a pneumatic spring which is strengthened by a reinforcement, whereby within the framework of a plurality of reinforcing layers, the cords are arranged crossed relative to one another from layer to layer.

Based on the state of the art outlined above, the problem of the invention is to prevent a hose-like body of the type specified above from tearing open in the longitudinal direction.

SUMMARY OF THE INVENTION

This problem is solved in that
the tubular body is equipped with an embedded slotted protection, a transverse reinforcement being used as slotted protection, such reinforcement being present in the crossed form and specifically in connection with a coiled or braided form, and whereby, furthermore,
the slit protection is prepared so as to be friendly to adhesion with the following structure of layers viewed from the outside inwardly:
outer layer;
adhesive layer;
reinforcement;
adhesive layer;
slit protection;
adhesive layer;
inner layer.

It is advantageous if the slit protection is a thread material in particular in the form of a thin thread with high stretchability, in particular again a thread based on polyamide. The thread material is in this connection usefully a single yarn with little or no twist. It is useful, furthermore, if the thread material has a titer of <dtex 470.

The transverse reinforcement particularly in the form of threads is advantageously arranged with wide spacings between the threads relative to one another, whereby the spacing particularly amounts to 5 to 15 mm and is identical in each case.

In connection with the bellows of a pneumatic cushioning system, the slit protection is usefully present either outside of the region of the rolling zone, or over the entire length including the region of the rolling zone.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

DETAILED DESCRIPTION OF THE PREFERRED EMBODIMENT

Figure 1:
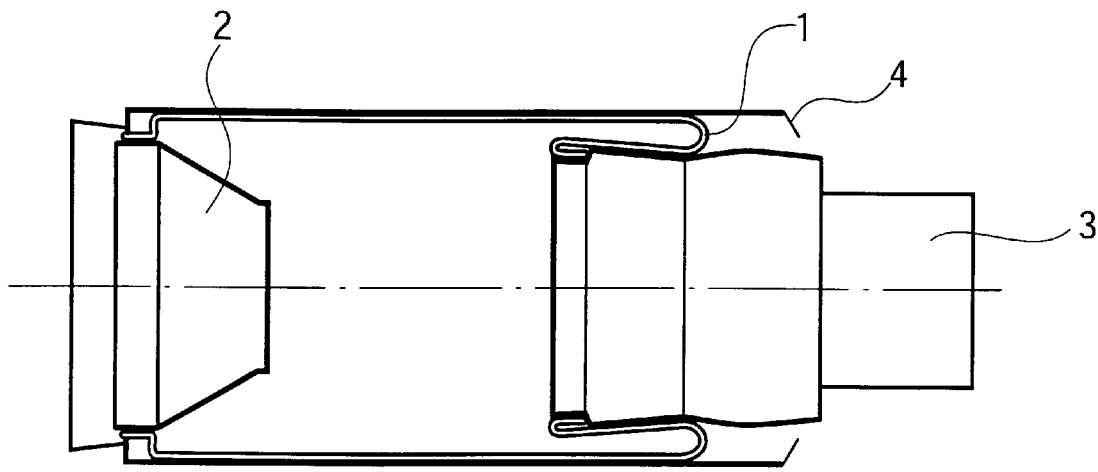
FIG. 1 shows a pneumatic cushioning system (in the expanded state).
Figure 2:
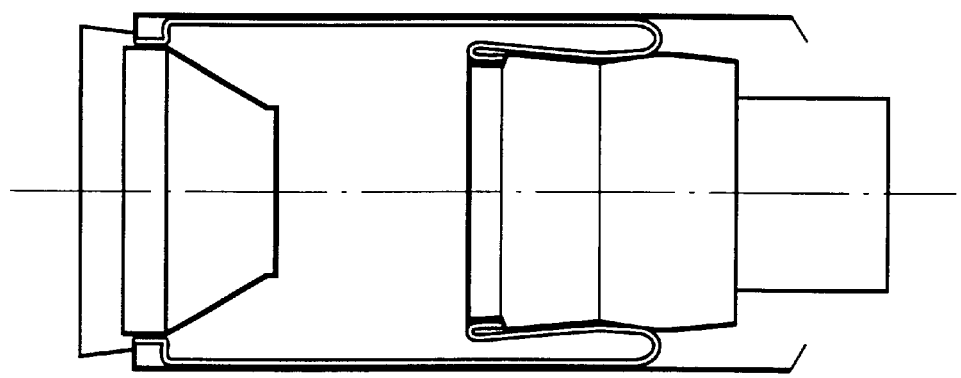
FIG. 2 shows a pneumatic cushioning system (in the compressed state).
Figure 3:
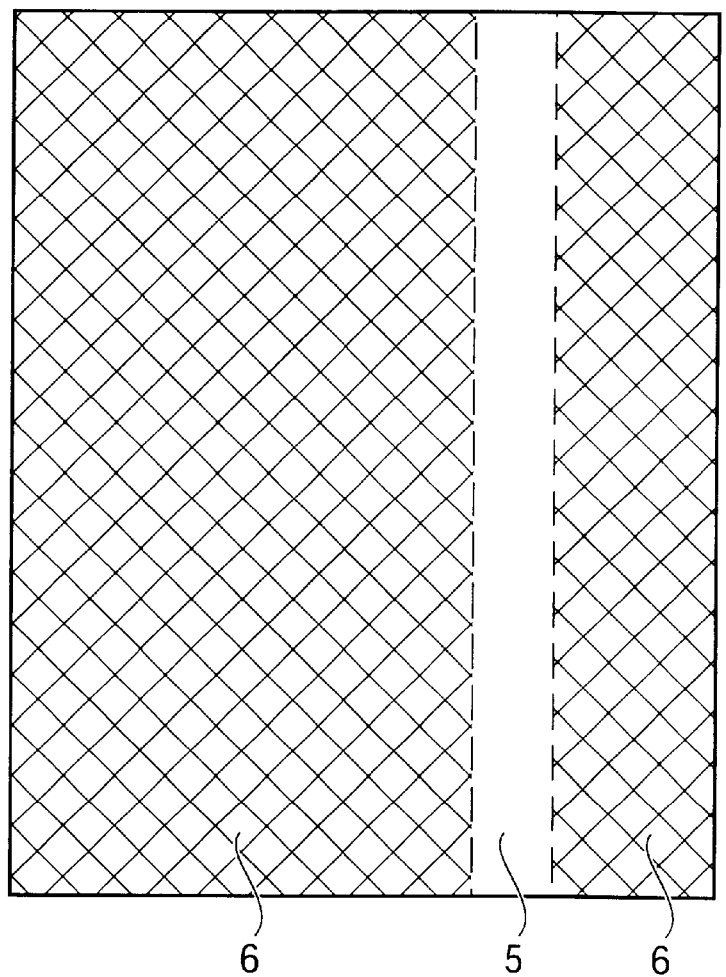
FIG. 3 shows the position of a crossed slotted protection in connection with a bellows.

According to FIGS. 1 and 2, the pneumatic cushioning system consists of a bellows 1, an upper clamping part 2, a lower clamping part 3, on the outer wall of which the bellows can roll off (rolling zone region 5 of the bellows; FIG. 3); as well as of an outer support tube 4.

FIG. 1 shows the expanded and FIG. 2 the compressed state of a pneumatic cushioning system.

FIG. 3 shows the position of a crossed slit protection 6 employed in connection with a bellows, whereby the slit protection is present outside of rolling zone region 5.

Figure 4:
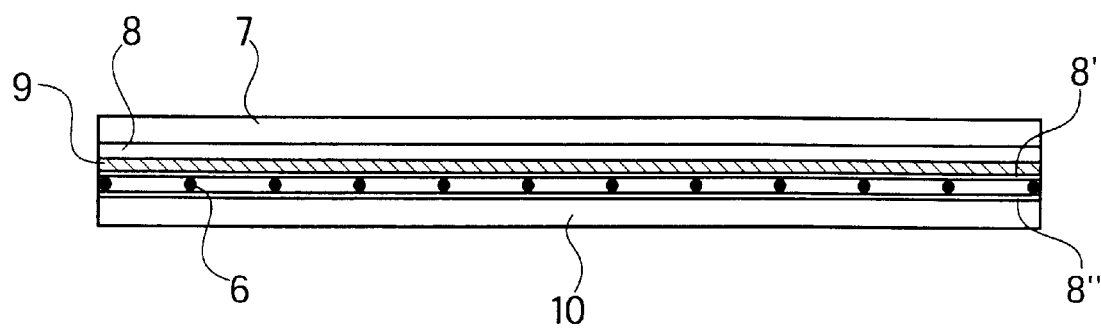
FIG. 4 shows the cross section of the wall of a bellows.

According to FIG. 4, the bellows has the Following structure of layers viewed from the outside inwardly;

Outer layer 7;
Adhesive layer 8;
Reinforcement 9;
adhesive layer 8';
Slotted protection 6;
Adhesive layer 8";
Inner layer 10.

In the drawings, wherein similar reference characters denote similar elements throughout the views:

Accordingly, while only a single embodiment of the present invention has been shown and described, it is obvious that many changes and modifications may be made thereunto without departing from the spirit and scope of the invention.

What is claimed is:

1. A tubular body made of elastomer material and having layers for the bellows of a pneumatic cushioning system comprising:

an outer layer (7);

a first adhesive layer (8) connected to the outer layer;

an embedded strength carrier layer (9) comprising thread reinforcements axially disposed in the tubular body after the first adhesive layer;

a second adhesive layer (8') connected to the strength carrier layer;

an embedded split protection layer (6) comprising a coiled transverse reinforcement adhesively disposed crosswise in the tubular body on the second adhesive layer;

a third adhesive layer (8") disposed on the split protection layer; and an inner layer (10) connected to the third adhesive layer.

2. The tubular body according to claim 1, wherein said slit protection comprises a thread material comprising a thin thread with high stretchability, and based on polyamide.

3. The tubular body according to claim 2, wherein said thread material comprises a single yarn with little twist.

4. The tubular body according to claim 2, wherein said thread material has a titer of <dtex 470.

5. The tubular body according to claim 1, wherein said transverse reinforcement comprises threads having a wide spacing from each other.

6. The tubular body according to claim 5, wherein said spacing is 5 to 15 mm.

7. The tubular body according to claim 5, wherein said spacings are identical.

8. The tubular body according to claim 1, wherein said slit protection is present in connection with the bellows (1) of the pneumatic cushioning system outside of a rolling zone region (5).

9. The tubular body according to claim 1, wherein said slit protection is present in connection with the bellows (1) of the pneumatic cushioning system over the entire length including a rolling zone region (5).

* * * * *